United States Patent
Lin

(10) Patent No.: US 6,792,353 B2
(45) Date of Patent: Sep. 14, 2004

(54) ENHANCED INERTIAL MEASUREMENT UNIT/GLOBAL POSITIONING SYSTEM MAPPING AND NAVIGATION PROCESS

(75) Inventor: Ching-Fang Lin, Simi Valley, CA (US)

(73) Assignee: American GNC Corporation, Simi Valley, CA (US)

(*) Notice: Subject to any disclaimer, the term of this patent is extended or adjusted under 35 U.S.C. 154(b) by 0 days.

(21) Appl. No.: 10/359,851

(22) Filed: Feb. 7, 2003

(65) Prior Publication Data

US 2003/0144795 A1 Jul. 31, 2003

Related U.S. Application Data

(62) Division of application No. 09/968,410, filed on Sep. 26, 2001, now Pat. No. 6,622,090.
(60) Provisional application No. 60/236,794, filed on Sep. 26, 2000.

(51) Int. Cl.⁷ .......................... G01C 21/30; H04B 7/185
(52) U.S. Cl. ....................... 701/213; 701/214; 701/216; 701/217; 342/357.06; 342/357.13; 342/357.14
(58) Field of Search ................................ 701/213, 214, 701/215, 216, 217, 220, 221, 207, 208; 342/357.01, 357.02, 357.03, 357.06, 357.12, 357.13, 357.14, 357.17; 340/988, 990, 995.1, 995.14, 995.19, 995.22; 244/3.15, 3.2

(56) References Cited

U.S. PATENT DOCUMENTS

| | | | | |
|---|---|---|---|---|
| 5,216,611 A | * | 6/1993 | McElreath | 701/221 |
| 5,657,025 A | * | 8/1997 | Ebner et al. | 701/300 |
| 5,774,824 A | * | 6/1998 | Streit et al. | 701/207 |
| 5,787,384 A | * | 7/1998 | Johnson | 701/216 |
| 5,894,323 A | * | 4/1999 | Kain et al. | 348/116 |
| 5,902,351 A | * | 5/1999 | Streit et al. | 701/220 |
| 5,906,655 A | * | 5/1999 | Fan | 701/216 |
| 6,037,893 A | * | 3/2000 | Lipman | 342/25 |
| 6,408,245 B1 | * | 6/2002 | An et al. | 701/216 |
| 6,415,227 B1 | * | 7/2002 | Lin | 701/213 |
| 6,417,802 B1 | * | 7/2002 | Diesel | 342/357.14 |
| 6,516,021 B1 | * | 2/2003 | Abbott et al. | 375/150 |
| 6,622,090 B2 | * | 9/2003 | Lin | 701/213 |

* cited by examiner

Primary Examiner—Jacques H. Louis-Jacques
(74) Attorney, Agent, or Firm—Raymond Y. Chan; David and Raymond Patent Group

(57) ABSTRACT

The present invention relates generally to a geospatial database access and query method, and more particularly to a map and Inertial Measurement Unit/Global Positioning System (IMU/GPS) navigation process. With the location information provided by an IMU/GPS integrated system, the geospatial database operations, such as database access and query, are sped up. With the map data from a geospatial database, the navigation performance and accuracy are enhanced. The present invention also supports real time mapping by using IMU/GPS integrated system as the positioning sensor.

10 Claims, 9 Drawing Sheets

ENHANCED INERTIAL MEASUREMENT UNIT/GLOBAL POSITIONING SYSTEM MAPPING AND NAVIGATION PROCESS

CROSS REFERENCE OF RELATED APPLICATION

This is a divisional application of a non-provisional application, application Ser. No. 09/968,410, filed on Sep. 26, 2001, now U.S. Pat. No. 6,622,090, which is a regular application of a provisional application, application No. 60/236,794, filed on of Sep. 26, 2000.

BACKGROUND OF THE PRESENT INVENTION

1. Field of Invention

The present invention relates generally to a geospatial database access and query method, and more particularly to a map and Inertial Measurement Unit/Global Positioning System (IMU/GPS) navigation process. With the location information provided by an IMU/GPS integrated system, the geospatial database operations, such as database access and query, are sped up. With the map data from a geospatial database, the navigation performance and accuracy are enhanced. The present invention also supports real time mapping by using IMU/GPS integrated system as the positioning sensor.

2. Description of Related Arts

A geospatial database has a big volume of spatial and text data which are organized in a file system or in tabular fashion. The data is used by the user to query spatial information and associated features and text descriptions. Due to the amount of a geospatial database, there exists difficulty to efficiently perform database access and query.

The coordinate information is the basic element of a geospatial database. There is a need to incorporate coordinate information into the geospatial database access and query operations.

The Global Positioning System (GPS) is an all-weather, space based navigation system under development by the Department of Defense (DoD) to satisfy the requirements for the military forces to accurately determine their position, velocity, and time in a common reference system, anywhere on the Earth on a continuous basis. To provide a continuous global positioning capability, a scheme to orbit a sufficient number of GPS satellites to ensure that four were always electronically visible was developed. The GPS receiver is used to measure the distances to the satellites. Then the location expressed as latitude, longitude and elevation are derived.

The global positioning system receiver, which includes an antenna, a signal processing unit, and associated electronics, receives signals from the global positioning system satellites to obtain position, velocity, and time solution. The global positioning system principle of operation is based on range triangulation. Because the satellite position is known accurately via ephemeris data, the user can track the satellite's transmitted signal and determine the signal propagation time. Since the signal travels at the speed of light, the user can calculate the geometrical range to the satellite. The actual range measurement (called the pseudorange) contains errors, for example, bias in the user's clock relative to global positioning system reference time. Because atomic clocks are utilized in the satellites, their errors are much smaller in magnitude than the users' clocks. Thus, for three-dimensional position determination, and also to calculate the cock bias, the pure global positioning system needs a minimum of four satellites to obtain the user's location.

The position accuracy provided by a GPS receiver is roughly 100 meters when only Coarse/Acquisition (C/A) code is employed and the Selective Availability (SA) is on. For personal navigation this position accuracy need to be enhanced. To obtain enhanced navigation function and accuracy, other navigation data should be incorporated in the navigation process, such as a geospatial database.

An allowed patent application entitled "Enhanced Global Positioning System and Map Navigation Process", application Ser. No. 09/546,349, invented by the same applicant of the present invention, Dr. Ching-Fang Lin, discloses a process of integrated GPS/Map database operation to facilitate the geospatial data query and to enhance navigation capability, but it still suffers the shortcoming of the blockage of GPS signals, thus the enhanced geospatial database operation and navigation couldn't be achieved without a position from the GPS receiver.

There is a large demand for use of a map guidance system when driving and hiking. The shortfall of a map-only system is that it is unable to obtain the user's current location and overlay it on the map. This system innovation and invention provides a method for map navigation enhanced by other positioning sensors, such as an inertial measurement unit/ global positioning system (IMU/GPS) integrated system. The integrated IMU/GPS provides uninterrupted position information for the carrier, thus is superior than the GPS-only positioning system. There is a further demand for a portable system for mapping. Low-cost and high accuracy positioning sensors are required to obtain coordinates of definable features, such as streets, buildings, rivers, or even mountains. The precision IMU/GPS integrated system is the right solution for a low-cost map guidance system.

SUMMARY OF THE PRESENT INVENTION

The main objective of the present invention is to provide an enhanced navigation process, which incorporates the GPS position data, IMU measurements, and geospatial map data.

Another objective of the present invention is to provide an efficient geospatial database query and access method by using GPS/IMU integrated position data in the geospatial data retrieval procedure.

Another objective of the present invention is to provide a time-space filtering method to fully fuse the GPS/IMU integrated position data and the geospatial map data to obtain enhanced navigation performance.

Another objective of the present invention is to provide a mechanism to incorporate the map data into the integration process of GPS and IMU measurements to improve the GPS/IMU navigation performance.

DETAILED DESCRIPTION OF THE PREFERRED EMBODIMENT

Figure 1:
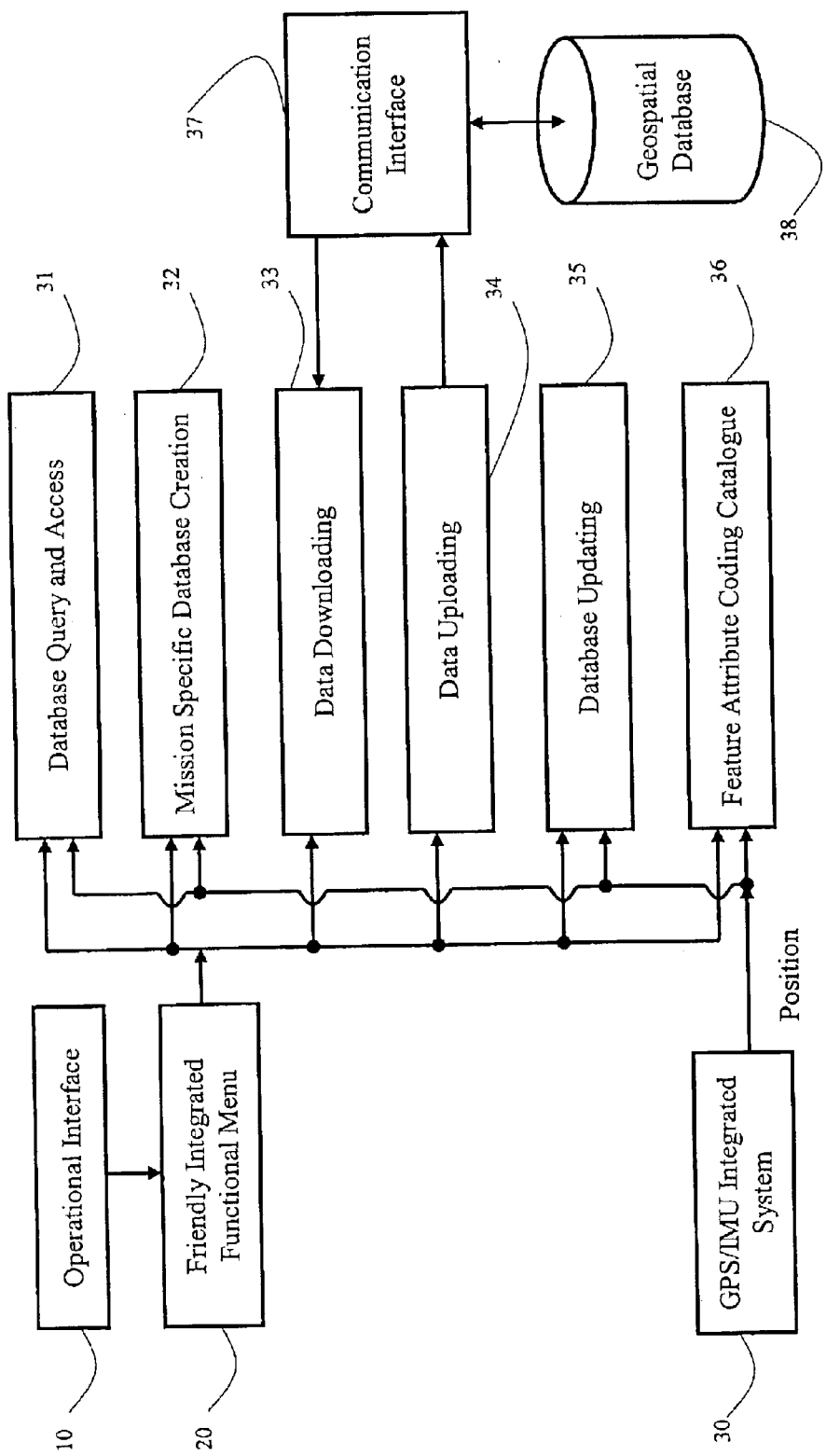
FIG. 1 is a block diagram illustrating the IMU/GPS based geospatial database operation method according to a preferred embodiment of the present invention.

A conventional IMU based system, in general, is costly. Weight, and large size lead to unfeasible deployment in a car or for being carried by a single individual. However, with the emergence of the MEMS (MicroElectronicMechanical System) technology, a miniature IMU based on MEMS technology becomes an embraceable reality.

American GNC Corporation, Simi Valley, Calif., developed MEMS angular rate sensors and MEMS ITMUs (Inertial Measurement Units), referring to U.S. patents pending, "MicroElectroMechanical System for Measuring Angular Rate", application No. 60/154,700; "Processing Method for Motion Measurement", application Ser. No. 09/399,980; "Angular Rate Producer with MicroElectroMechanical System Technology", application Ser. No. 09/442, 596; "Micro Inertial Measurement Unit", application Ser. No. 09/477,151. American GNC corporation also developed the coremicro™ IMU, which is currently "The world's smallest" IMU, is based on the combination of solid state MicroElectroMechanical Systems (MEMS) inertial sensors and Application Specific Integrated Circuits (ASIC) implementation. The coremicro™ IMU is a fully self contained motion-sensing unit. It provides angle increments, velocity increments, a time base (sync) in three axes and is capable of withstanding high vibration and acceleration. The coremicro™ IMU is opening versatile commercial applications, in which conventional IMUs can not be applicable, include land navigation, automobile navigation, personal hand held navigators, robotics, marine vehicles and unmanned air vehicles, various communication, instrumentation, guidance, navigation, and control applications.

The American GNC Corporation manufactured micro IMU can be directly applied to the mapping systems and map-based navigation systems.

A geospatial database has a large volume of spatial and text data which is organized in a file system or in tabular fashion. The data is used by the user to query spatial information and associated features and text descriptions. Due to the amount of a geospatial database, there exists difficulty to efficiently perform database access and query.

The position accuracy provided by a GPS receiver is roughly 100 meters when only Coarse/Acquisition (C/A) code is employed and the Selective Availability (SA) is on. For personal navigation this position's accuracy needs to be enhanced. To obtain enhanced navigation function and accuracy, other navigation data should be incorporated in the navigation process, such as an inertial measurement unit (IMU) and a geospatial database.

American GNC Corporation further developed a land and water navigator, U.S. provisional patent pending No. 60/167830, "Vehicle Self-Carried Positioning Method and System Thereof". The main objective of the invention is to provide a self-contained positioning method and system to determine position information on land and in water with high accuracy. The land and water navigator invention has evolved from the coremicro™ IMU, patent pending. The navigator can receive but not rely on GPS signal and DGPS signals for a highly accurate positional solution. Without GPS/DGPS signals, the land and navigator also provides a highly accurate positional solution, such as an accuracy of better than 1 percent of the distance traveled. The land and water navigator is the right positioning system with reasonable size and weight and power consumption for commercial vehicle operation, which can be used in areas where GPS signals are not available, such as tunnels, forested areas, urbanized terrain, and high Electronic Counter Measure (ECM) environments.

American GNC Corporation further developed a hand-held navigator, U.S. provisional patent pending No. 60/167825, entitled "Self-Contained Positioning Method and System Thereof for Hand-Held Navigator". The main objective of that invention is to provide self-contained positioning methodology and a system with reasonable size and weight and power consumption for hand-held operation to determine position for a user on land with high accuracy. The hand-held navigator invention has evolved from the coremicro™ IMU, patent pending. The navigator can receive but not rely on GPS signal and DGPS signals for a highly accurate positional solution. Without GPS/DGPS signals, the hand-held navigator also provides highly accurate positional solution, with an accuracy of better than 1 percent of the distance traveled. The hand-held navigator is the right positioning system with reasonable size and weight and power consumption for commercial applications, which can be used in areas where GPS signals are not available, such as tunnels, forested areas, urbanized terrain, and high Electronic Counter Measure (ECM) environments.

The present invention uses the MEMS IMU coupled with a GPS sensor to provide location information and features both portability and ease-of-use. It accommodates IMU/GPS-based efficient geospatial database access and query process, mission specific database creation and value-adding techniques. Key technologies, such as: IMU/GPS based database matching, IMU/GPS based involved tile finding, primitive access, IMU/GPS based spatial queries, IMU/GPS based mission specific database creation, IMU/GPS based value-adding, and time-space filtering process for full fusion of IMU/GPS position data and geospatial map data are included in the present invention.

The IMU/GPS-based spatial query includes the point query process, the line query process, and the area query process. These processes provide an efficient spatial query solution in the geospatial database. The IMU/GPS-based mission specific database creation process is to perform efficient mission specific geospatial database generation.

An IMU/GPS-based geospatial database value-adding process is to perform geospatial database value-adding using an IMU/GPS integrated system as the basic device for acquisition of an object's geospatial information. The IMU/GPS integrated system provides an efficient method to capture the geospatial information associated with a spatial object. A feature attribute coding catalogue 36 (FACC) provides an encoding and decoding system for the features and attributes search and adding. All the feature and attribute related files are updated during the feature and attribute addition.

The major application of the present invention is for personal navigation, car navigation, and also can be used for access, query, updating and value-adding to a geospatial database.

The geospatial database can be a remote database, which is not stored in the navigation process platform, such as a personal computer, a notebook computer, or a palm computer. Referring to FIG. 1, an enhanced inertial measurement unit/global positioning system mapping and navigation system according to a preferred embodiment of the present invention comprises an operational interface 10, a friendly integrated functional menu 20, an IMU/GPS integrated system 30, a database query and access module 31, a mission specific database creation module 32, a data downloading module 33, a data uploading module 34, a database updating module 35, a feature attribute coding catalogue 36, a position sensor 50, a communication interface 37, and a geospatial database 38.

The operational interface 10 provides the user with the entry of commands. The operational interface 10 includes a touch screen with which the user can use his finger or a stylus to operate the embedded software, for example to perform database query. The operational interface 10 can also be enhanced by a soft keyboard with which the user can input commands exactly like the keyboard of a desktop computer. The operational interface 10 can also be a handwriting recognition system. The user can just write the commands on the screen to input commands. The friendly integrated functional menu 20 provides the user with involved navigation and database query functions, including map viewer, trip scheduler, IMU/GPS navigator, street locator, snap router, and information query. The map viewer shows an electronic map on the screen of a computer to show where the user is. The user can use scroll bar to roam the map. The trip scheduler provides for a trip planning function for the user. The IMU/GPS navigator provides the user with real-time navigation information, including position, velocity, and heading. The street locator provides the user with capability to find an address of interest. The snap router provides the user with optimized time-based or cost-based routes. For example, a delivery company may make delivery to multiple customers at the same time. The deliverer can use this snap router to obtain a delivery route based on shortest time consumption or for a more economical route, such as to avoid a toll freeway.

The database query and access module 31 employs the IMU/GPS position data to perform efficient geospatial data retrieval, which includes node primitive retrieval, edge primitive retrieval, area primitive retrieval, and attribute retrieval.

The communication interface 37 provides a communication link between the remote geospatial database 38 and the navigation process platform. The communication link candidates are radio, personal communication system, public service telecommunication network, and satellite communication system.

The mission specific database creation module 32 generates local database on the navigation process platform to support the IMU/GPS/Map navigation process. The data downloading module 33 downloads geospatial data from the remote database via the communication interface 37.

The data updating module 35 provides new data to the geospatial database 38. The new data is uploaded to the remote geospatial database 38 through the data uploading module 34. The feature attribute coding catalogue 36 is used to encode the new added data and features. The feature attribute coding catalogue 36 is also used to decode the data in the database query and access module 31 and the mission specific database creation module 32.

Figure 2:
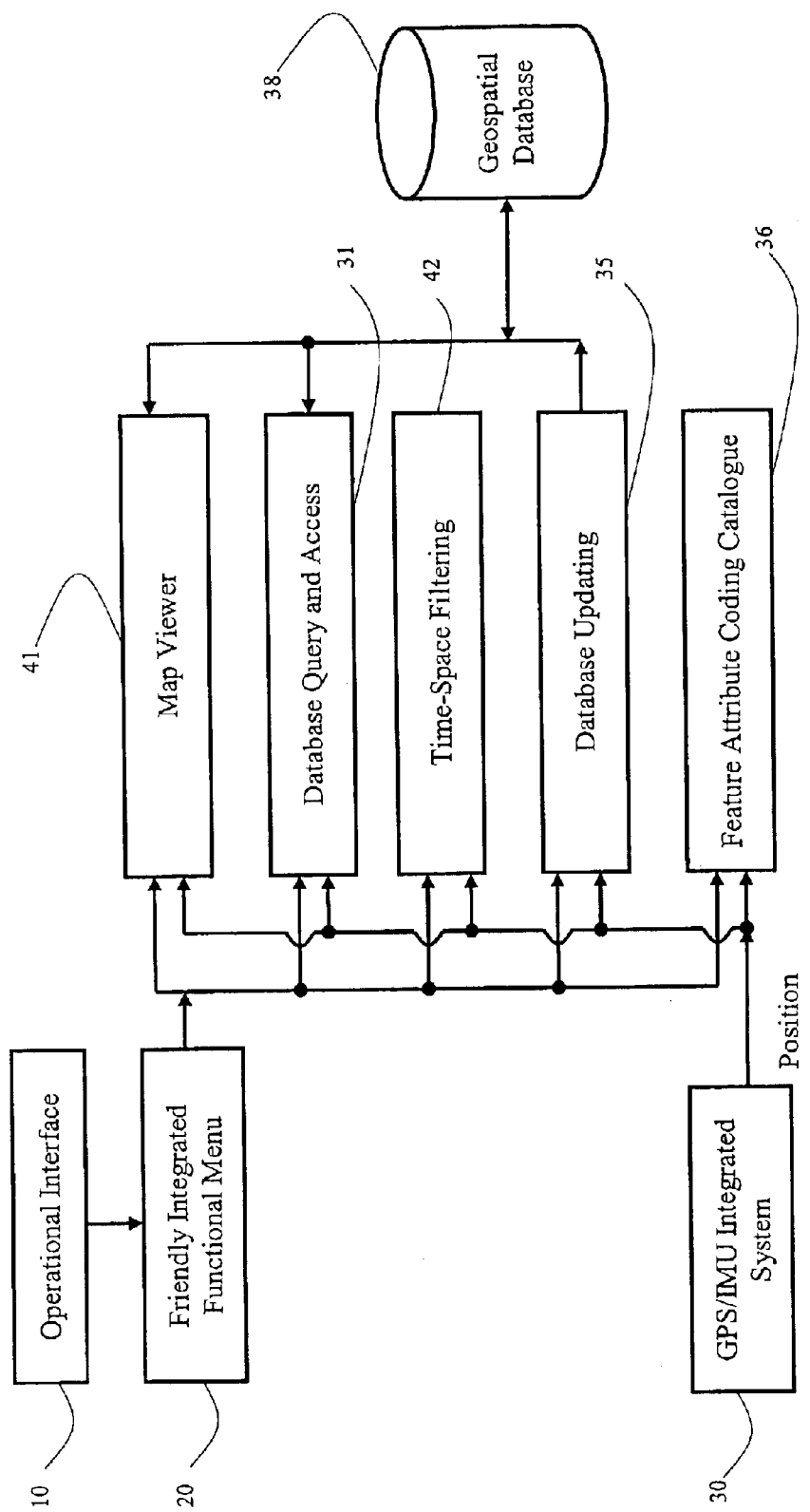
FIG. 2 is a block diagram illustrating the IMU/GPS based geospatial map navigation process according to an alternative mode of the preferred embodiments of the present invention.

If the geospatial database 38 can be a local database stored on the IMU/GPS/Map navigation process platform, referring to FIG. 2, an alternative mode of the enhanced inertial measurement unit/global positioning system and map navigation system is employed, which also comprises the operational interface 10, the friendly integrated functional menu 20, the database query and access module 31, the database updating module 35, and a feature attribute coding catalogue 36, and further comprises a map viewer 41 and a time-space filtering module 42.

The map viewer 41 displays the map and user mark on the screen. The user mark tracks the user's position. The user's motion trajectory can also be displayed on the screen. The map viewer 41 includes zoom in and zoom out functions. The user can also use the map viewer 41 to roam the map.

The time-space filtering module 42 is used to fully fuse the IMU/GPS data and the geospatial map data. The time-space filtering technique is a valuable solution for enhanced navigation process which assures that the user's tracking mark is on the road and track the user correctly and with high accuracy.

Figure 3:
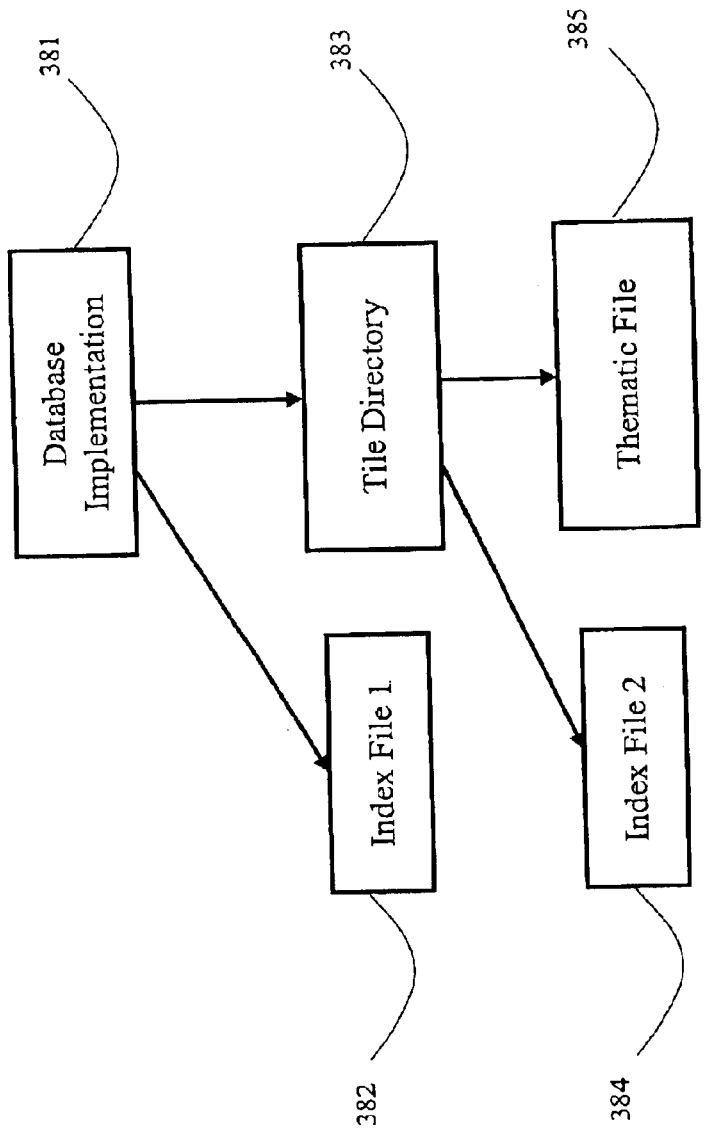
FIG. 3 is a block diagram delineating the hierarchy structure of a geospatial map database which is used with an IMU/GPS integrated system for enhanced navigation process.
Figure 4:
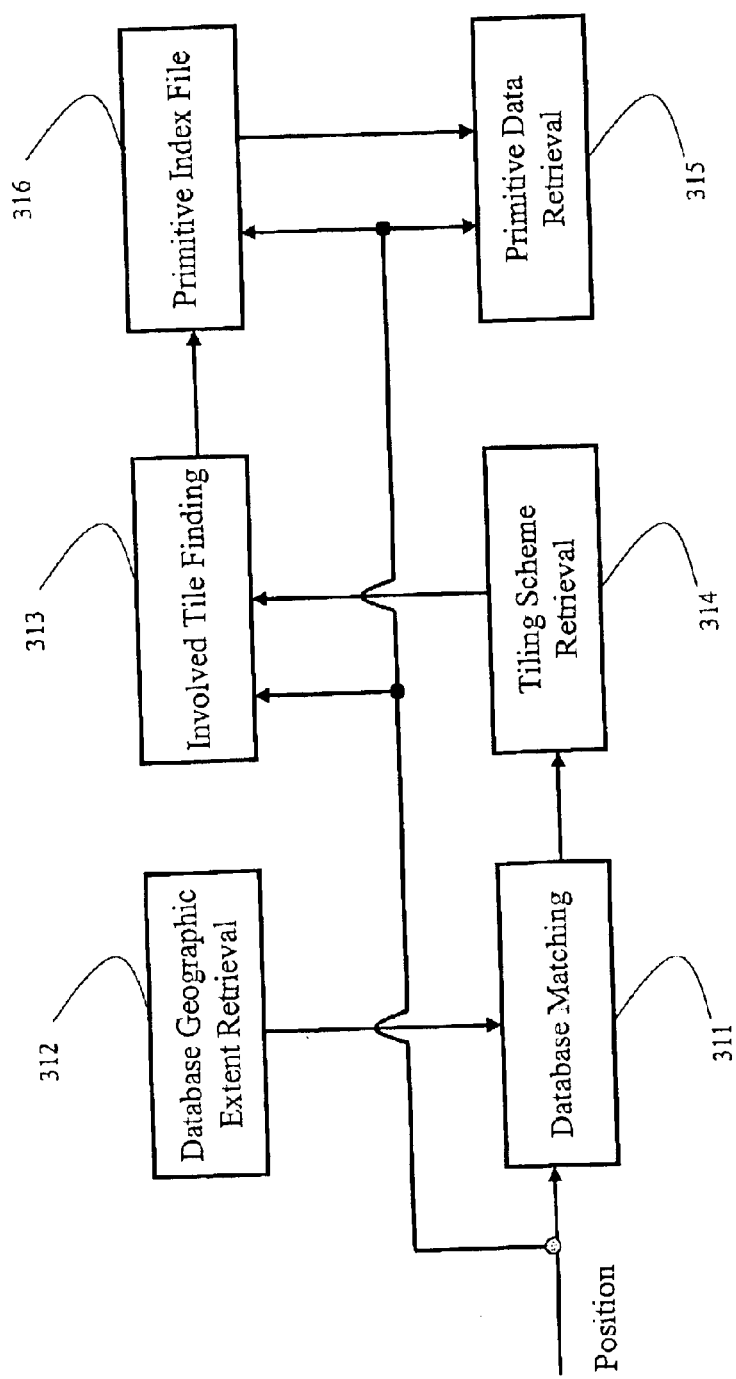
FIG. 4 is a block diagram illustrating the database access and primitive retrieval process of a geospatial map database with aiding from an IMU/GPS position.

As shown in FIG. 4, the IMU/GPS-based geospatial database query and access module 31 includes a 3-level data search procedure: 1) IMU/GPS based database matching 311, 2) IMU/GPS based involved tile finding procedure 313, and 3) IMU/GPS based primitive access procedure 315. This process is relevant to the database implementation 381 as shown in FIG. 3.

Global scale databases inevitably consist of large amounts of data. In processing the geographic data, entire files often need to be managed in memory, imposing a definite limit on database size. Tiling is the method used to break up geographic data into spatial units small enough to fit within the limitations of the desired hardware platform and media.

Tiling means geographically subdividing a coverage solely for the purpose of enhancing data management; a coverage subdivided in such a manner is then referred to as a tiled coverage.

A tile index file is mandatory if a database contains tiled directories. The spatial extent of the database and its tiling scheme are represented in the tile index file. A tiled coverage contains the same attribute information as an untiled coverage. The logical interpretation of a tiled coverage is identical to that of an untiled one. Each tile will be a separate subdirectory and contains separate primitive tables for those features contained within the tile.

Primitive access for untiled coverages can be performed on the whole geographic extent of the database. Primitive access for tiled coverage will be done through two continuous procedures as follows: 1) the IMU/GPS-based tile finding procedure is applied to find the involved tiles, and 2) the geometric and cartographic primitive access is done on the regional extent of an individual involved tile at the corresponding tile subdirectory. This IMU/GPS based primitive access strategy speeds up the search procedure of the primitive.

The geospatial database 38 includes a main directory in which the index file 1 (382) and tile directory reside 383.

Under the tile directory there are index file 2 (384) and thematic files 385. The index file 1 provides the tile information, including tile's name, directory, and geospatial extent. The data are stored in individual tile directory. The index file 2 gives the primitive and theme information. The primitives are node, edge, and area.

Multiple databases are used to geographically cover a country or the world. The first step for the database access process is the database matching procedure. This is done by comparing the defined access area and the geospatial extent of a database. If the defined access area is included in or intersects with the geospatial database 38 this database will be used for data access.

The second step for the database access process is the involved tile finding procedure 313, which is used to speed up the geospatial data access. The principle of the IMU/GPS-based tile finding is to match the defined access area with the separate tiles to derive the involved tiles. The primitive (such as node, edge and face) access is only performed upon the involved tiles. This method avoids a global search for geospatial data to speed up database access processing.

The third step is the primitive access procedure 315 that is applied to perform node, edge, area, and attributes retrieval.

Geodetic Coordinate (GDC) systems are based on approximation of the shape of the Earth. The shape of the Earth was defined by classical navigators as a spherical body. More accurate geodetic coordinates require that the Earth be modeled instead as an oblate spheroid, or an ellipsoid-of-rotation. GDCs are those that relate Earth-centered angular latitude and longitude (and optionally height) to an actual point near or on the Earth's surface.

Latitude is defined to be the angle subtended with the ellipsoid's equatorial plane by a perpendicular through the surface of the ellipsoid from a point. Latitude is positive if north of the equator, negative if south. Longitude is defined as the angle measured about the minor (polar) axis of the ellipsoid from a prime meridian to the meridian through a point. It is positive if the point is east of the prime meridian, and negative if the point is west of the prime meridian. Unlike latitude, which has a nautical origin at the equator, there is no feature on the ellipsoid which forms a nautical origin for the measurement of longitude. The zero longitude can be any defined meridian. Historically, nations have used the meridian through their national astronomical observatories, giving rise to several prime meridians. By current convention, the meridian through Greenwich, England is the standard prime meridian.

The ellipsoid and the datum are the two major components of a GDC. There are many ellipsoids in use to model the Earth and each particular ellipsoid can have its location and orientation relative to the Earth defined in different ways. The location and orientation of the ellipsoid with respect to the Earth is defined by the datum. World Geodetic System 1984 (WGS-84) defines the current U.S. DoD standard datum.

The WGS-84 acts as the IMU/GPS system's reference system, and the Mean Sea Level (MSL) is the vertical datum. When the geospatial database 38 uses different reference system or/and vertical datum, a coordinate conversion between the different reference systems and datum must be done.

The user location [$\phi_u, \lambda_u$] can be derived from an IMU/GPS integrated system in form of geodetic Latitude and Longitude coordinates, where $\phi_u$ is the latitude and $\lambda_u$ is the longitude. The user location can be mapped into a point (x,y) on a plane. There are many kinds of map projections. In principle, $$x = x(\phi, \lambda; a, b)$$
$$y = y(\phi, \lambda; a, b) \tag{1}$$

is the general formulation of the desired map projection, and a, b are the semi-axis of the reference ellipsoid. Geodetic applications require conformal projections to be used. Conformality means that an angle on the ellipsoid is preserved after mapping it into the plane. More precisely, the angle included by two geodesics on the ellipsoid is preserved if the two geodesics are conformally mapped into the plane. Here, the Transverse Mercator projection is taken to perform the conformal projection from the Ellipsoid coordinate into the Cartesian coordinate.

In this method, the ellipsoid is partitioned into 120 zones of 3° longitude each. In the middle of each zone there is the central meridian. The projection cylinder is transverse to the ellipsoid and tangent along a central meridian. The developing cylinder, that is opened to make a plane, yields a straight line for the central meridian with no scale distortion. In a plane, the mapped central meridian represents the y-axis (north direction). The x-axis is the mapping of the equator. In the mapping of a zone, the central meridian and the equator are special cases since all other meridians and parallels are mapped as curved lines. Because of conformality, the mapped images of the meridians and parallels are orthogonal to each other. The numbering of the zones is related to the Greenwich meridian. The mapping formulas for the Transverse Mercator projection are given by $$x = B(\phi) + \frac{1}{2}N\cos^2\phi t l^2 + \frac{1}{24}N\cos^4\phi t (5 - t^2 + 9\eta^2)l^4 + \ldots \tag{2}$$

$$y = N\cos\phi l + \frac{1}{6}N\cos^3\phi(1 - t^2 + \eta^2)l^3 +$$

$$\frac{1}{120}N\cos^5\phi(5 - 18t^2 + t^4)l^5 + \ldots$$

where $B(\phi)$ arc length of meridian from equator

N radius of curvature in prime vertical t=tan $\phi$ auxiliary quantity $\lambda_0$ longitude of the central meridian l=$\lambda$-$\lambda_0$ longitude difference $\eta^2$=$e^2$ cos$^2$ $\phi$ auxiliary quantity On Purpose, y is given first and then x, because the pair of coordinates (y,x) corresponds to ($\phi,\lambda$). The arc length of the meridian B($\phi$) is the ellipsoidal distance from the equator to the point to be mapped and can be computed by the following series expansion:

$$B(\phi) = \alpha(\phi + \beta\sin 2\phi + \lambda\sin 4\phi + \delta\sin 6\phi + \ldots) \tag{3}$$

where $$\alpha = \frac{a+b}{2}\left(1 + \frac{1}{4}n^2 + \frac{1}{64}n^4 + \ldots\right)$$

$$\beta = -\frac{3}{2}n + \frac{9}{16}n^3 - \frac{3}{32}n^5 + \ldots$$

-continued $$\gamma = \frac{15}{16}n^2 - \frac{15}{32}n^4 + \ldots$$

$$\delta = -\frac{35}{48}n^3 + \frac{105}{256}n^4 - \ldots$$

$$n = \frac{a-b}{a+b}$$

Applying equation (2) to the IMU/GPS derived user location $(\phi_u, \lambda_u)$, the Cartesian coordinate pair $(x_u, y_u)$ is obtained.

The range of user interest is represented by $\lfloor r_x, r_y \rfloor$, where $r_x$ is the user-defined range along the longitude axis, and $r_y$ is the user-defined range along the latitude axis.

The geographic extent of the user-defined access area in degrees is derived by the following procedures:

Step 1: Calculate a Cartesian coordinate $(x_u, y_u)$ of a user location;

Step 2: Obtain a user-defined area $[x_{u\ min}, y_{u\ min}; x_{u\ max}, y_{u\ max}]$ in a Cartesian Coordinate System;

Step 3: Determine the user-defined area $[\phi_{u\ min}, \lambda_{u\ min}; \phi_{u\ max}, \lambda_{u\ max}]$ in degrees in an Ellipsoidal Coordinate System.

The objective of Step 1 is mapping a point $(\phi, \lambda)$ on the ellipsoid into a point $(x,y)$ on a plane. This can be done by applying Equation (2). Step 2 is computed by the following procedure:

$$[x_{u\ min}, y_{u\ min}; x_{u\ max}, y_{u\ max}] = (x_u, y_u) \oplus (r_x, r_y) \quad (4)$$

where the symbol $\oplus$ represents the following operations:

$$x_{umin} = x_u - \frac{1}{2}r_x \quad (5)$$

$$x_{umax} = x_u + \frac{1}{2}r_x$$

$$y_{umin} = y_u - \frac{1}{2}r_y$$

$$y_{umax} = x_u + \frac{1}{2}r_y$$

Step 3 is the inverse procedure of the Step 1, that is the transformation of a point $(x,y)$ in the plane to a point $(\phi, \lambda)$ on the ellipsoid. The principle methodology is the same, the coordinates on the ellipsoid are obtained from series expansions:

$$\phi = \phi_f - \frac{t_f}{2N_f^2}(1+\eta_f^2)x^2 + \frac{t_f}{24N_f^4}(5+3t_f^2+6\eta_f^2-6t_f^2\eta_f^2)x^4 \ldots \quad (6)$$

$$\lambda = \lambda_0 + \frac{1}{N_f \cos\phi_f}x - \frac{1}{6N_f^3 \cos\phi_f}(1+2t_f^2+\eta_f^2)x^3 \ldots$$

The terms with the subscript f must be calculated based on the footpoint latitude $\phi_f$. For the footpoint latitude, the series expansion $$\phi_f = \bar{y} + \mu\sin 2\bar{y} + \lambda\sin 4\bar{y} + \delta\sin 6\bar{y} \quad (7)$$

is used where $$\bar{y} = \frac{y}{\alpha} \quad (8)$$

The coefficients $\alpha$, $\beta$, $\lambda$, $\delta$ depend on the ellipsoidal parameters. The preferred values are the parameters for the Bessel ellipsoid:

$\alpha = 6366742.5205 m$ $\beta = 2.51127324 \times 10^{-6}$ $\lambda = 3.67879 \times 10^{-6}$ $\delta = 7.38 \times 10^{-9}$ \quad (9)

Applying equation (6) to $[x_{min}, y_{u\ min}; x_{u\ max}, y_{u\ max}]$ the user-defined area $[\phi_{u\ min}, y_{u\ min}; \phi_{u\ max}, \lambda_{u\ max}]$ in the ellipsoid coordinate system is obtained.

Assume that $[\phi_{min}, \lambda_{min}; \phi_{max}, \lambda_{max}]$ represents the geographic extent of a regional geospatial database 38. The IMU/GPS-based database matching is given by $$\text{BOOL}\ [\phi_{min}, \lambda_{min};\ \phi_{max}, \lambda_{max}] \oplus [\phi_{u\ min}, \lambda_{u\ min}; \phi_{u\ max}, \lambda_{u\ max}] \quad (10)$$

with a BOOL value output. When the given database is involved, the BOOL is TRUE (1) or the BOOL is FALSE (0). The symbol $\oplus$ represents the following operations:

$\lambda_{min} < \lambda_{u\ min} < \lambda_{max}\ \&\ \lambda\phi_{min} < \phi_{u\ min} < \phi_{max}$: return TRUE $\lambda_{min} < \lambda_{u\ min} < \lambda_{max}\ \&\ \phi_{min} < \phi_{u\ max} < \phi_{max}$: return TRUE $\lambda_{min} < \lambda_{u\ max} < \lambda_{max}\ \&\ \phi_{min} < \phi_{u\ max} < \phi_{max}$: return TRUE $\lambda_{min} < \lambda_{u\ max} < \lambda_{max}\ \&\ \phi_{min} < \phi_{u\ min} < \phi_{max}$: return TRUE $\lambda_{u\ min} < \lambda_{min},\ \lambda_{max} < \lambda_{u\ max}\ \&\ \phi_{u\ min} < \phi_{min},\ \phi_{max} < \phi_{u\ max}$: return TRUE others: return FALSE \quad (11)

When the inequalities $\lambda_{min} < \lambda_{u\ min} < \lambda_{max}\ \&\ \phi_{min} < \phi_{u\ min} < \phi_{max}$ are met, the left-lower corner of the user-defined access area is contained in the given regional database. When the inequalities $\lambda_{min} < \lambda_{u\ min} < \lambda_{max}\ \&\ \phi_{min} < \phi_{u\ max} < \phi_{max}$ are met, the left-upper corner of the user-defined access area is contained in the given regional database. When the inequalities $\lambda_{min} < \lambda_{u\ max} < \lambda_{max}\ \&\ \phi_{min} < \phi_{u\ max} < \phi_{max}$ are met, the right-upper corner of the user-defined access area is contained in the given regional database. When the inequalities $\lambda_{min} < \lambda_{u\ max} < \lambda_{max}\ \&\ \phi_{min} < \phi_{u\ min} < \phi_{max}$ are met, the right-lower corner of the user-defined access area is contained in the given regional database. When the inequalities $\lambda_{u\ min} < \lambda_{min}, \lambda_{max} < \lambda_{u\ max}\ \&\ \phi_{u\ min} < \phi_{min}, \phi_{max} < \phi_{u\ max}$ are met, the given database is wholly contained by the user-defined access area.

Assume that $[\phi_{min}, \lambda_{min}; \phi_{max}, \lambda_{max}]_{ti}$ represents the geographic extent of tile i. The IMU/GPS-based involved tile finding is given by $$\text{BOOL} = [\phi_{min}, \lambda_{min}; \phi_{max}, \lambda_{max}]_{ti} \oplus [\phi_{u\ min}, \lambda_{u\ min}; \phi_{u\ max}, \lambda_{u\ max}] \quad (12)$$

with a BOOL value output. When the given tile is involved, the BOOL is TRUE (1) or FALSE (0). The symbol X conforms to the operations given by Equation (11).

Only the involved tiles will be considered during the primitive access. The primitives, such as the nodes, edges, faces and text, which are included in the involved tiles, will be further considered whether it is involved within the user-defined access area or not.

Connected nodes are always found at the ends of edges and are topologically linked to the edges. Connected nodes are used in two ways: to define edges topologically, and to represent point features, such as overpasses, locks in a canal, or underground utility access points. Under the first usage, the connected nodes are referred to as start and end nodes. Under the second usage, attributes will be associated with the point features related to the connected nodes.

A simple mathematical comparison is taken to determine whether the given node in an involved tile is included in the access area. If it is, this node will be used to retrieve the topological relationships with other primitives. If not, this node will be neglected in the further topographic processing. The access area is given by $[\phi_{u\ min}, \lambda_{u\ min}; \phi_{u\ max}, \lambda_{u\ max}]$. The comparison is given by if $\phi_{u\ min} < \phi_{cn} < \phi_{u\ max}$ & $\lambda_{u\ min} < \lambda_{cn} < \lambda_{u\ max}$ return TRUE(1) others return FALSE(0)     (13)

Edges are one-dimensional primitives that are used to represent the locations of linear features (such as roads) and the borders of faces. Edges are comprises an ordered collection of two or more coordinate tuples (pairs or triplets). At least two of the coordinate tuples must be distinct. The orientation of an edge is defined by the ordering of the coordinate tuples.

Edges are topologically defined by nodes. Then areas are defined by edges. In addition to the Start Node and End Node columns in an edge primitive file, the Right Edge, Left Edge, Right Face and Left Face are necessary to support higher topological levels. The topology information permits the query and retrieval of features. The direction of an edge is its orientation from the Start Node to the End Node. Each edge primitive table has an associated Edge Bounding Rectangle (EBR) table which contains the MBR information for every edge. There is a one-to-one relationship between the edge table and its associated Edge Bounding Rectangle Table.

The access area is given by $[\phi_{u\ min}, \lambda_{u\ min}; \phi_{u\ max}, \lambda_{u\ max}]$. Assume that $[\phi_{e\ min}, \lambda_{e\ min}; \phi_{e\ max}, \lambda_{e\ max}]$ represents the edge bounding rectangle. The involved edge finding algorithm is given by BOOL=$[\phi_{e\ min}, \lambda_{e\ min}; \phi_{e\ max}, \lambda_{e\ max}] \oplus [\phi_{u\ min}, \lambda_{u\ min}; \phi_{u\ max}, \lambda_{u\ max}]$     (14)

with a BOOL value output. When the given edge is involved, the BOOL is TRUE (1) or FALSE (0). The operator $\oplus$ conforms to the following operation:

$\lambda_{min} < \lambda_{u\ min} < \lambda_{max}$ & $\phi_{min} < \phi_{u\ min} < \phi_{max}$: return TRUE $\lambda_{min} < \lambda_{u\ min} < \lambda_{max}$ & $\phi_{min} < \phi_{u\ max} < \phi_{max}$: return TRUE $\lambda_{min} < \lambda_{u\ max} < \lambda_{max}$ & $\phi_{min} < \phi_{u\ max} < \phi_{max}$: return TRUE $\lambda_{min} < \lambda_{u\ max} < \lambda_{max}$ & $\phi_{min} < \phi_{u\ min} < \phi_{max}$: return TRUE $\lambda_{u\ min} < \lambda_{min}, \lambda_{max} < \lambda_{u\ max}$ & $\phi_{u\ min} < \phi_{min}, \phi_{max} < \phi_{u\ max}$: return TRUE others: return FALSE     (15)

A face primitive is a two-dimensional spatial object enclosed by edges. Faces are used to represent area features, such as lakes, countries, or urban areas. Faces are defined by topological references to a set of edges that compose the face border. A face may have interior borders as well as exterior borders, allowing for faces that have other smaller faces within them. This relation consists of a reference to the start of a closed ring of edges. A face may consist of multiple rings. Only one outer ring will be assigned to a face. Faces are non-overlapping, and the faces in a coverage completely exhaust the area of a plane. Each face table has a related Face Bounding Rectangle (FBR) table which contains the MBR information for each face. There is a one to one relationship between the face table and the associated FBR table.

The access area is given by $[\phi_{u\ min}, \lambda_{u\ min}; \phi_{u\ max}, \lambda_{u\ max}]$. Assume that $[\phi_{f\ min}, \lambda_{f\ min}; \phi_{f\ max}, \lambda_{f\ max}]$ represents the face bounding rectangle. The involved face finding algorithm is given by BOOL $[\phi_{f\ min}, \lambda_{f\ min}; \phi_{f\ max}, \lambda_{f\ max}] \oplus [\phi_{u\ min}, \lambda_{u\ min}; \phi_{u\ max}, \lambda_{u\ max}]$     (16)

with a BOOL value output. When the given face is involved, the BOOL is TRUE (1) or FALSE (0). The operator $\oplus$ conforms to the operation given by Equation (15).

A spatial query is the procedure used to obtain or capture the features and attributes related to a spatial object, such as point, line and/or area, through a geospatial database access. The spatial object is defined through the user points at a specific position on a display device containing a graphic representation of the data. In order to get the information about the spatial object, the query algorithm must search the primitive table for an exact match with this object.

The IMU/GPS-based database query comprises three types of spatial query: IMU/GPS-based point query, IMU/GPS-based line query, and IMU/GPS-based area query. Basically, the IMU/GPS based spatial object queries comprises a 2-step search procedure, which are 1) destination tile finding and 2) spatial query using the spatial index file.

In order to use the spatial index in the spatial queries, it is necessary to find the involved tiles during spatial queries because the spatial index file pertains to the tile directory. Tiles maintain spatially distributed primitives in separate directories. Thus, the query can be done for a tiled database in only the relevant tile after the appropriate tile has been identified.

The results from the IMU/GPS based efficient geospatial data access can be directly used to reduce the spatial search range for object queries. Suppose that the involved databases are represented as $D_i (i=1,2,\Lambda,n)$. These databases are with respect to the extent $[\phi_{min}, \lambda_{min}; \phi_{max}, \lambda_{max}]_i$, where n is the number of involved databases. The involved tiles in the databases $D_i$ are $T_i^j (j=1,2,\Lambda,m_i)$, where $m_i$ is the number of involved tiles in the database $D_i$.

The first step in destination tile finding is the database matching procedure done on the involved database. The involved databases are given by the IMU/GPS-based database matching process. The database matching for spatial queries is performed only on these involved databases. Denote the coordinates of a point on the display device as $[x_s, y_s]$ in the screen plane coordinate system, where the origin is at the upper-left corner of the screen. The coordinates of the upper-left screen corner in the Cartesian Coordinate System are denoted as $[x_0, y_0]$. The corresponding Cartesian coordinate of the position on the screen is given by the following vector sum:

$[x, y] = [x_0, y_0] + [k_1 x_s, k_2 y_s]$     (17)

In Equation (17) $k_1$ and $k_2$ are the scale factor along the horizontal and vertical axis, respectively. Normally the relation $k_1 = -k_2$ holds.

Next, the transformation of the point $[x,y]$ in the plane to the point $[\phi, \lambda]$ on the ellipsoid is made. The coordinates on the ellipsoid are obtained through a series expansion as shown in Equations 6–9.

The database matching algorithm for spatial query is given by

BOOL = $[\phi, \lambda] o [\phi_{min}, \lambda_{min}; \phi_{max}, \lambda_{max}]_i$   i=1,2,$\Lambda$,n     (18)

with a BOOL value output. In Formula (18) the number n represents the total number of databases involved. When the primitive queried is contained in the database, the BOOL is TRUE (1). When the primitive queried is not contained in the database, the BOOL is FALSE (0). The symbol o represents the following operations:

$\phi_{min} \leq \phi \leq \phi_{max}$ & $\lambda_{min} \leq \lambda \leq \lambda_{max}$ return TRUE others return FALSE     (19)

The spatial query will be performed on the database which makes Formula (19) return TRUE.

The second step in the destination tile finding procedure is tile matching. The involved tiles are given by the IMU/GPS-based involved tile finding process. The tile matching for spatial queries are performed only on these involved tiles. The corresponding area to an individual tile can be indexed according to the index file 1.

Assuming that $[\phi_{min},\lambda_{min};\phi_{max},\lambda_{max}]_{ti}$ represents the geographic extent of the tile, the tile matching process is given by $$BOOL = [\phi,\lambda] o [\phi_{min},\lambda_{min};\phi_{max},\lambda_{max}]_{ti} \quad (20)$$

with a BOOL value output. When the primitive queried is contained in the tile, the BOOL is set to TRUE (1), else the BOOL is FALSE (0). The symbol o represents the operations given by Formula (19).

The second step in the IMU/GPS based spatial query is to use the appropriate spatial index file for spatial information retrieval. It is necessary for the algorithm to exhaustively check nodes and text primitives for satisfaction of a spatial query, since these primitives do not have associated minimum bounding rectangles. The coordinates of the primitive are used to ensure the accurate retrieval of primitive ids from the spatial index.

Point query is aimed at finding the node (connected or entity) in the vicinity of the query point. The vicinity area is defined as a circle on the screen with a radius R and centered at the query point. The radius R is given with a specific number of pixels.

Figure 5:
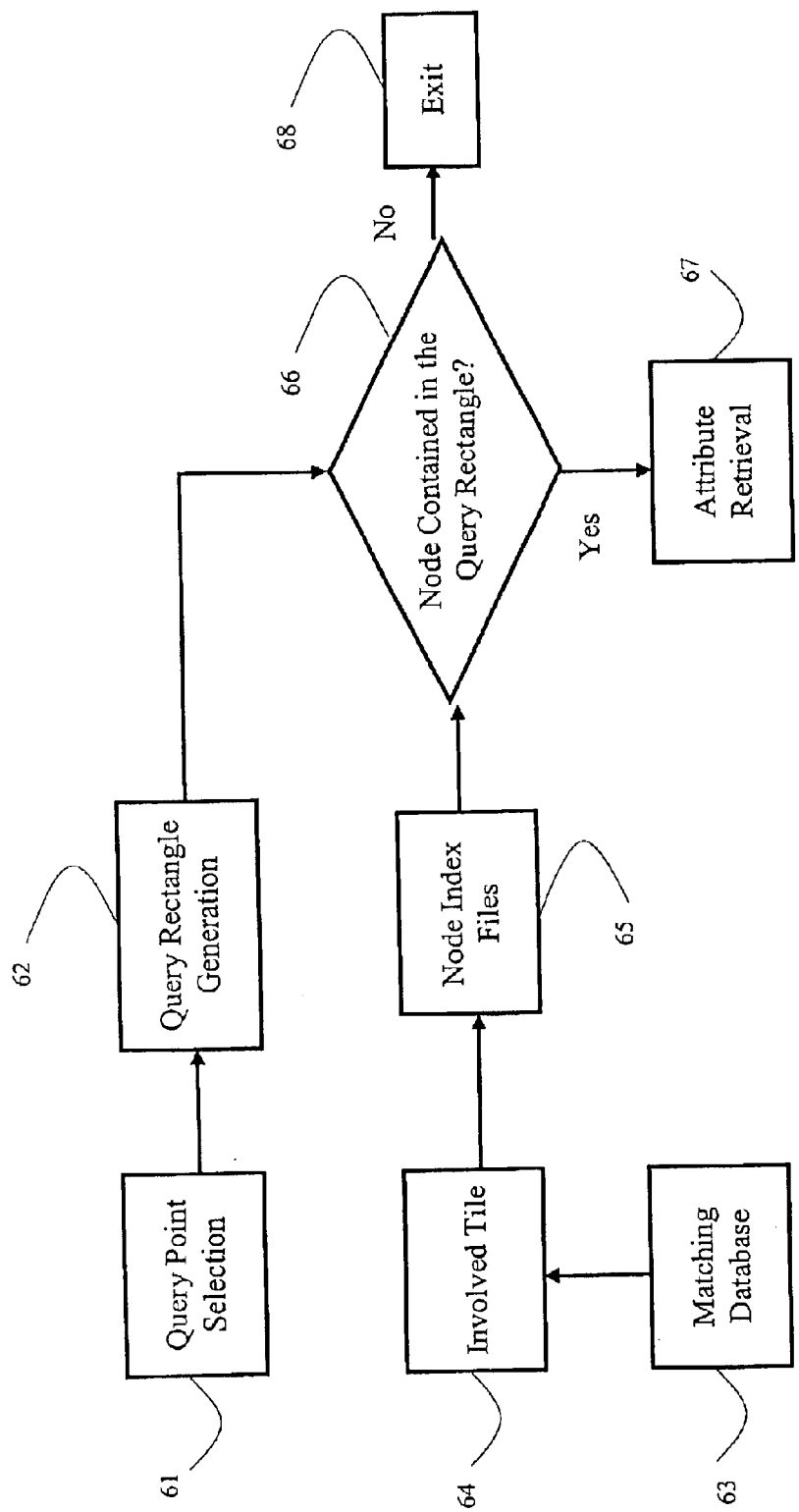
FIG. 5 illustrates the IMU/GPS based point query procedure of the present invention.

Referring to FIG. 5, the point query comprises a query point selection 61, a query rectangle generation 62, a matching database 63, an involved tile 64, a node index files 65, and an attribute retrieval module 67.

Based on the corresponding node index file 65, the ids of nodes which are located in the vicinity of the query point will be retrieved. Using these node ids, the corresponding geodetic coordinates can be obtained. Further point query processing is done to get the features and attributes associated with the queried nodes. The features and attributes can be reported in text format.

Suppose that the corresponding geodetic coordinate of the query point is given by $[\phi_O,\lambda_O]$, which can be derived from its screen coordinate through the transformation given by Equations (6) through (9). This coordinate is converted into the spatial index coordinate system as follows:

$$x_o = int\left[\frac{\lambda_o - \lambda_{min}}{\lambda_{max} - \lambda_{min}} \times 255\right]$$

$$y_o = int\left[\frac{\phi_o - \phi_{min}}{\phi_{max} - \phi_{min}} \times 255\right] \quad (21)$$

where the operator int is to get the integer part, $x_O$ is the normalized coordinate along the horizontal axis; $y_O$ is the normalized coordinate along the vertical axis; $\phi_{max}$, $\phi_{min}$, $\lambda_{max}$ and $\lambda_{min}$ are given in the header of the node index file, which defines the Minimum Bounding Rectangle.

The circle on the screen is converted into a query rectangle (QR) in the spatial index coordinate system. This procedure is done in the query rectangle generation module. The nodes contained in this rectangle will be queried.

The four 1-byte integers defining the MBR $[x_{n\,min}, y_{n\,min}; x_{n\,max}, y_{n\,max}]$ for a node primitive are given in the node index file. The relationships $x_{n\,max} - x_{n\,min} \leq 1$ and $y_{n\,max} - y_{n\,min} \leq 1$ hold for the node primitive. The following operations are used to determine whether a node is contained in the query rectangle:

$$BOOL\ if\ [x_A,y_C;x_B,y_D] I\ [x_{n\,min},y_{n\,min};x_{n\,max},y_{n\,max}] \neq 0\ return$$
$$TRUE\ else\ return\ FALSE \quad (22)$$

The symbol I represents the intersection set of the query rectangle and the MBR for a node primitive. A BOOL value of TRUE means that the given node is contained in the query rectangle.

Figure 6:
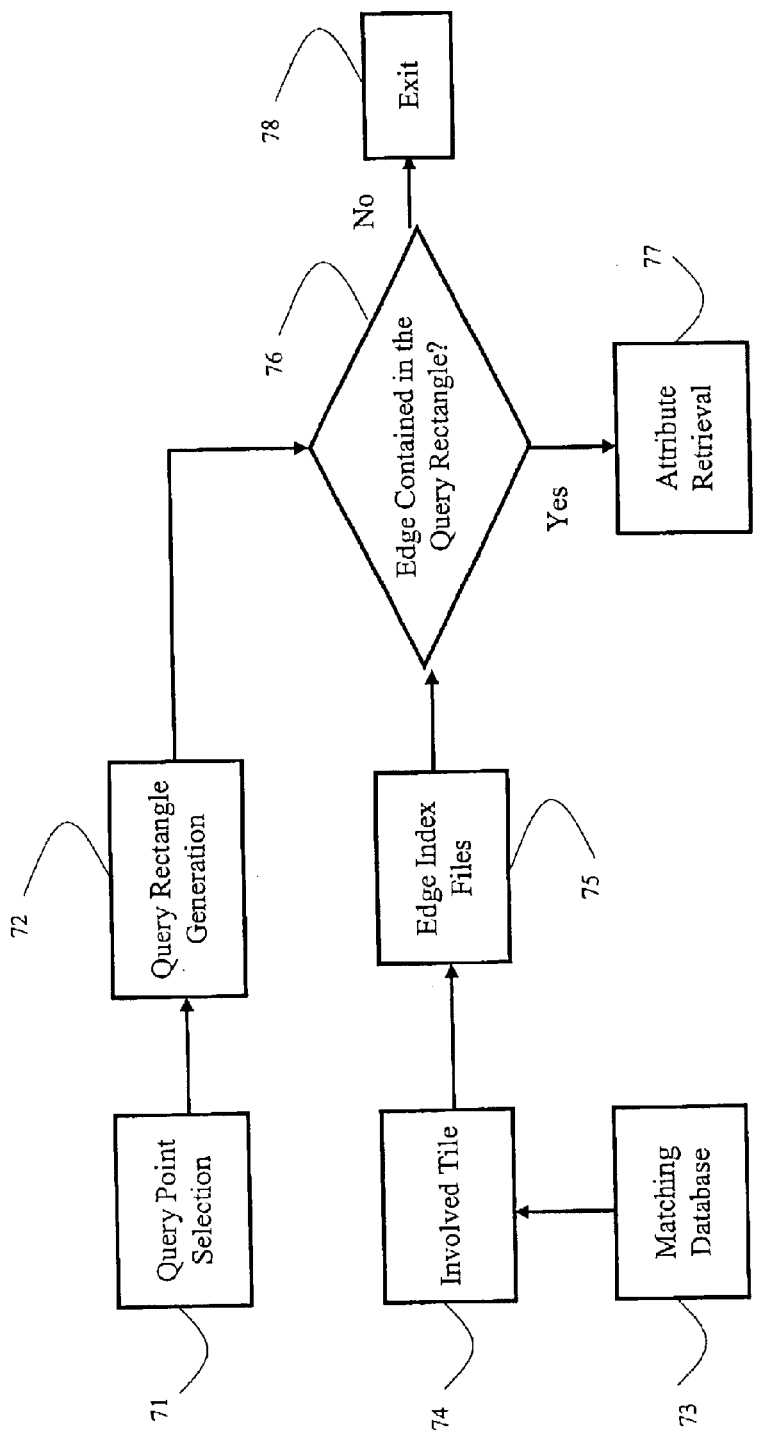
FIG. 6 illustrates the IMU/GPS based line query procedure of the present invention.

Line query is aimed at finding the edges in the vicinity of the query point. The vicinity area is also defined as a circle on the screen with a radius R and centered at the query point. The radius R is given with a specific number of pixels. Referring to FIG. 6, the edge query comprises a query point selection 71, a query rectangel generation 72, a matching database 73, an involved tile 74, an edge index files 75, and an attribute retrieval module 77.

Based on the corresponding edge index file 75, the ids of the edges located in the vicinity of the query point will be retrieved. With these edge ids and the corresponding edge file, the edges and the corresponding geodetic coordinates of the connected nodes can be obtained. Further line query processing is done to get the features and attributes associated with the queried edges. The features and attributes can be reported in text format.

The circle on the screen is converted into a query rectangle (QR) in the spatial index coordinate system. This is done in the query rectangle generation module 73. The edges whose MBR intersect the query rectangle will be queried.

The four 1-byte integers defining the MBR $[x_{e\,min}, y_{e\,min}; x_{e\,max}, y_{e\,max}]$ for an edge primitive are given in the edge index file. The following operations are used to determine whether an edge MBR intersects the query rectangle:

$BOOL\ if\ x_A \leq x_{e\,min} \leq x_C\ \&\ y_B \leq y_{e\,min} \leq y_D\ return\ TRUE$ $if\ x_{A<xe\,max} \leq x_C\ \&\ y_B \leq y_{e\,min} \leq y_D\ return\ TRUE$ $if\ x_A \leq x_{e\,min} \leq x_C\ \&\ y_B \leq y_{e\,max} \leq y_D\ return\ TRUE$ $if\ x_A \leq x_{e\,max} \leq x_C\ \&\ y_B \leq y_{e\,max} \leq y_D\ return\ TRUE\ else\ return$
$FALSE \quad (23)$ A BOOL value of TRUE means that the given edge intersects the query rectangle.

Based on the edge ids derived from the edge index file, the edges can be retrieved from the corresponding edge primitive table.

Figure 7:
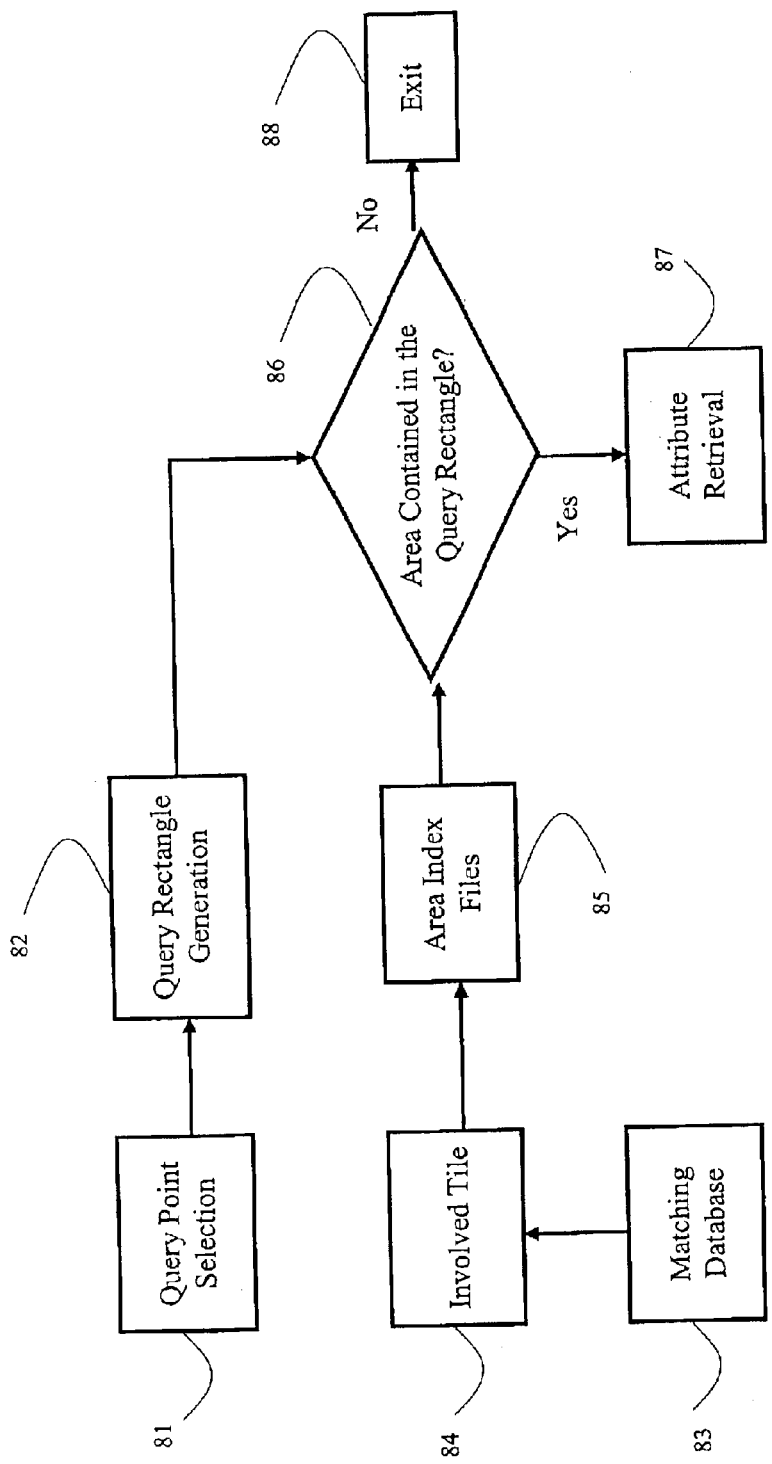
FIG. 7 illustrates the IMU/GPS based area query procedure of the present invention.

Area query is aimed at finding the faces in the vicinity of the query point. A simpler query operation can be used for area query. This process determines whether the query point is contained in the area defined by the face primitive. The first step is to get the ids for the faces whose MBR includes the query point from the face index file. Then the faces are retrieved based on the face ids. The ring table can be used here to get the geographical area defined by the retrieved face. The conclusion is made in the end on whether the query point is contained in this area. If so, the corresponding face will be queried. Referring to FIG. 7, the area query comprises a query point selection 81, a query rectangel generation 82, a matching database 83, an involved tile 84, an area index files 85, and an attribute retrieval module 87. The area query process follows:

Step 1: Determine the faces whose MBRs contain the query point.

Suppose that the MBR for a face is represented as $[x_{f\,min}, y_{f\,min}; x_{f\,max}, y_{f\,max}]$, which is given in the face index file. The following operation is used to determine the faces containing the query point.

$BOOL\ x_{f\,min} \leq x_O \leq x_{f\,max}\ \&\ y_{f\,min} \leq y_O \leq y_{f\,max}\ return\ TRUE\ else$
$return\ FALSE \quad (24)$ Here the $[x_O, y_O]$ represents the normalized coordinate for the query point in the spatial index coordinate system.

Step 2: Retrieve the ring relating to the face.

The ids derived from the face index file are used to retrieve the associated ring ids from the face primitive file.

Step 3: Retrieve the area defined by a face.

The ring file provides a start edge for the face. Then travel to the left edge and read the left edge. The procedure is performed until a return to the start edge.

Step 4: Determine whether the query point is included in the retrieved area.

With these retrieved face ids, the corresponding geographic location can be obtained through retrieving the corresponding rings and the associated edges through the winged topological relationship retrieval. The further area query processing is accomplished to get the features and attributes associated with the queried faces. The associated area feature table will be used to check what features are related to a given face. The area features are given by feature attribute code catalogue.

The retrieved geospatial data is displayed on the screen. The data include entity node, line, and area. The entity node includes school, hospital, gas station, bank, restaurant, etc. The line primitive includes road, street, freeway, river, etc. The area includes park, lake, etc. These map data can be integrated with IMU/GPS data to provide enhanced navigation performance and accuracy.

Figure 8:
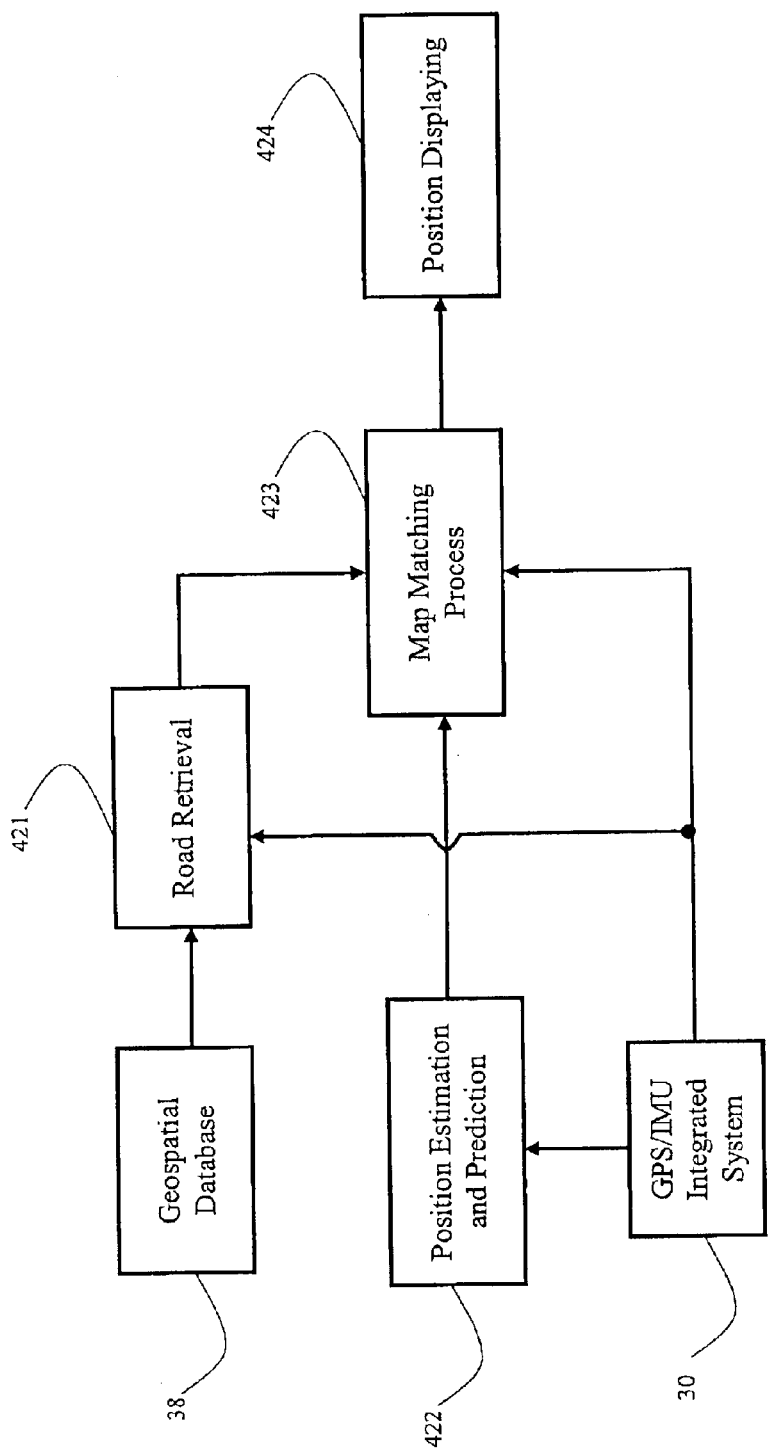
FIG. 8 illustrates the time-space filtering with the IMU/GPS data and the geospatial map data for enhanced navigation performance and accuracy.

FIG. 8 illustrates the time-space filtering process for fully fusion of IMU/GPS data and the map data. This time-space filtering process is mainly used for tracking of the user's position in real time. When the user is travelling on the freeway, the user's position mark might be not displayed on the freeway due to the position error of an IMU/GPS integrated system. This phenomena can be avoided by introducing the time-space filtering algorithm.

The time-space filtering process comprises a geospatial database 38, a road retrieval module 421, an IMU/GPS integrated system 30, a position estimation and prediction module 422, a map matching process module 423, and a position display module 424.

The IMU/GPS integrated system 30 provides the user's current position and velocity. Based on the measurements of the current position and velocity the user's next position and velocity are estimated and predicted in the position estimation and prediction module 422. The predicted user's next position is output to the map matching process module 423. The road retrieval module 421 obtains the road information in the vicinity of the user from the geospatial database 38. The road data is output the map matching process module 423. The map matching process also receives the user's position measured by the position sensor.

The user's true position is provided by the following process:

$$P_t = (P_p + P_m)/2 \tag{25}$$

where $P_t$ is the true position, $P_p$ is the predicted position calculated in the position estimation and prediction module 422, $P_m$ is the user's position measured by the position sensor.

The user's true position is further fused with the road data to enhance the navigation performance. A threshold is preset to check whether the user is on the road or not. The threshold is set based on the accuracy of the position sensor. Usually average error of the position sensor can be used as the threshold. When distance from the user's true position to the road is less than the threshold, the user's tracking mark will be moved from the calculated true position to the road. This is reasonable to understand that the user must be travelling on the road. If distance from the user's true position to the road is larger than the threshold, the user's tracking mark will be displayed at the calculated true position.

Figure 9:
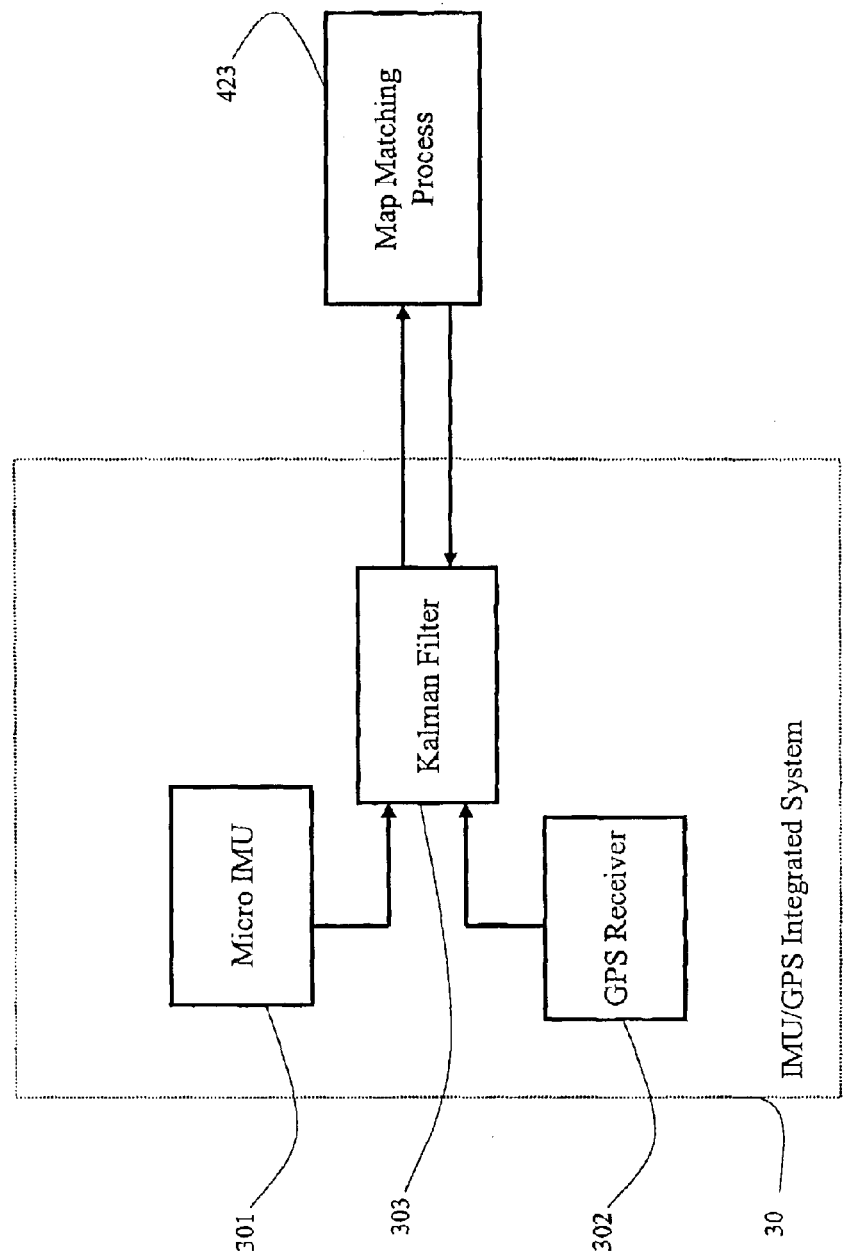
FIG. 9 illustrates the enhanced IMU/GPS/Map navigation processing, where the position data derived from the IMU/GPS integrated system is sent to the map matching process and the output of the map matching process is fed back to the Kalman filter of the IMU/GPS integrated system to improve the IMU/GPS system performance.

FIG. 9 shows the enhanced navigation process by using the data from a micro IMU 301, a GPS receiver 302, and a database. The inertial measurement from an IMU is fused with the observables from a GPS receiver to deliver precise position data in a Kalman filter 303. The IMU/GPS integrated position solution is sent to the map matching process module to derive the true user location. The true user location is fed back to the Kalman filter of the IMU/GPS integrated system to further correct the errors in the IMU/GPS system.

A method for enhanced IMU/GPS/Map navigation process can be realized under Arc/View environment. Arc/View is a software package for mapping from ESRI (Environmental Systems Research Institute), Inc.

Accordingly, an enhanced inertial measurement unit/global positioning system and map navigation process, comprises the steps of:

(a) receiving a position from an TNU/GPS integrated system;

(b) retrieving geospatial data from a geospatial map database based on the position from the IMU/GPS integrated system;

(c) performing time-space filtering based on the position and the retrieved geospatial data from the geospatial map database to derive a displaying position for a user;

(d) displaying the user's position on a graphic displaying unit such as a screen; and (e) feeding the location data from the map matching process module to the Kalman filter that blends the measurements from the micro IMU and GPS receiver to further correct navigation errors.

The enhanced inertial measurement unit/global positioning system mapping and navigation process of the present invention further comprises the step of:

before the step (c), displaying the retrieved geospatial data on the graphic displaying unit, and after the step (c), displaying an accurate position of the user on the graphic displaying unit as a mark, wherein the retrieved geospatial data is displayed as a background.

The step (b) further comprises the steps of:

(b-1) defining an access area based on the position from the position determination device and a geographic extent, wherein the position from the IMU/GPS integrated system is a center of the access area, and the geographic extent is input by the user;

(b-2) performing a database matching process to derive involved geospatial database, wherein the geographic extent of the access area is compared with a geographic extent of the geospatial database to check whether the access area is included in the geospatial database, intersects with the geospatial database, or is excluded from the geospatial database;

(b-3) performing an involved tile finding process on the involved databases to derive involved tiles, wherein the tile is geographically subdividing a coverage solely for the purpose of enhancing data management, wherein a tile index file is used to retrieve a geographic extent of the tile, and the geographic extent of the access area is compared with the geographic extent of the tile to check whether the access area is included in the tile, intersects with the tile, or is excluded from the tile; and (b-4) performing primitive access process on the involved tiles, wherein the primitive access comprises a node access, an edge access, and an area access, wherein the primitive includes a node, an edge, and an area, wherein the node, the edge, and the area in the involved tiles are retrieved.

The step (c) comprises the steps of:

(c-1) predicting the user's next position based on the user's current position and velocity from the IMU/GPS integrated system;

(c-2) calculating the user's true position based on the predicted user's position and a measured position from the IMU/GPS integrated system, wherein the user's true position is an average position of the predicted user's position and the measured position from the IMU/GPS integrated system;

(c-3) computing a distance from the user's true position to a road neighboring the user; and (c-4) comparing the distance from the user's true position to the road neighboring the user with a threshold, wherein the threshold is preset based on the accuracy of the IMU/GPS integrated system, and the user's position mark is displayed on the road when the distance from the user's true position to the road neighboring the user is less than the threshold, wherein the user's position mark is displayed at the calculated true position when the distance from the user's true position to the road neighboring of the user is larger than the threshold.

According to the present invention, the enhanced inertial measurement unit/global positioning system mapping and navigation system is employed to processed the above navigation process, wherein the enhanced IMU/GPS/Map navigation system comprises:

(1) a remote geospatial database 38 which is stored on a remote computer system, wherein the remote computer system is connected with a computing platform for the enhanced IMU/GPS/Map navigation process via a data link;

(2) an operational interface 10, which provides a command input method for a user;

(3) an integrated menu 20, which provides a collection of functional menus for the user;

(4) an IMU/GPS integrated system 30 for producing a location for the user;

(5) a database query and access module 31, which provides IMU/GPS-based efficient geospatial database access and spatial query;

(6) a mission specific database creation module 32, which is responsible for generating a local database stored in the computing platform for the enhanced inertial measurement unit/global positioning system and map navigation process from the remote geospatial database;

(7) a database updating module 35, which provides a method for adding new features using an IMU/GPS integrated system as a basic device;

(8) a feature attribute coding catalogue 36, which is used for encoding for the new features added to the geospatial database and for decoding for the efficient database access and query;

(9) a communication interface 37, which provides a communication link between the remote geospatial database and the computing platform for the enhanced inertial measurement unit/global positioning system mapping and navigation process;

(10) a data uploading module 34, which is responsible for transmitting the new features added to the database to the remote geospatial database via the communication interface 37;

(11) a data downloading module 33, which is responsible for transmitting the created mission specific database from the remote geospatial database to the computing platform for enhanced IMU/GPS/Map navigation process.

According to an alternative mode of the present invention, for applications where specific map data is applied, an alterative mode of the enhanced inertial measurement unit/global positioning system mapping and navigation process comprises the steps of:

(a) receiving a position of a user from an IMU/GPS integrated system;

(b) converting a global coordinate to a local coordinate to match a coordinate system employed in a map database;

(c) retrieving geospatial data from a geospatial map database based on the position from the IMIU/GPS integrated system to form retrieved geospatial data;

(d) performing time-space filtering based on the position and the retrieved geospatial data from the geospatial map database to derive a displaying position for a user; and (e) performing coordinate conversion from the local coordinate to a pixel coordinate and displaying the position of the user on a displaying unit.

Also, an alternative mode of the enhanced inertial measurement unit/global positioning system and map navigation system to be employed for processing the above alternative navigation process comprises:

(1) a geospatial database 38 is stored on a computing platform for the enhanced IMU/GPS/Map navigation process and provides a spatial information for a user;

(2) an operational interface 10, which provides a command input method for the user;

(3) an integrated menu 20, which provides a collection of functional menus for the user;

(4) an IMU/GPS integrated system for producing location information for the user;

(5) a database query and access module 31, which provides an IMU/GPS-based efficient geospatial database access and spatial query;

(6) a database updating module 35, which provides a method for adding new features using an IMU/GPS integrated system as a basic device;

(7) a feature attribute coding catalogue 36, which is used for encoding for the new features added to the geospatial database and for decoding for the efficient database access and query 31;

(8) a map viewer 41 for displaying a map and a user mark on a screen, for displaying trajectory of user's motion, and for zooming in and zooming out display of the geospatial data 38, wherein the map is generated from retrieved geospatial data in the database access and query module 31 and displayed as background, the user mark is displayed on the screen to show a position of the user;

(9) a time-space filtering module 42 for fully fusing an IMU/GPS position from an IMU/GPS integrated system and the retrieved geospatial data in the database query and access module 31 to derive an accurate position of the user.

(10) a Kalman filter 303 for blending measurements from a micro IMU 301 and a GPS receiver 302 to deliver an integrated navigation solution, where the location data from the map matching process module 423 is also incorporated in the Kalman filtering processing.

What is claimed is:

1. An enhanced inertial measurement unit/global positioning system and map navigation process, comprising steps of:
   (a) receiving a measured position from an integrated inertial measurement unit/global positioning system device, wherein said integrated inertial measurement unit/global positioning system device comprises a micro IMU, a GPS receiver and means for blending measurements from said micro IMU and said GPS receiver;
   (b) retrieving geospatial data from a geospatial map database based on said measured position from said integrated inertial measurement unit/global positioning system device by using a tile index file, wherein s aid tile index file stores geographic extent information of tiles which are geographically subdividing a coverage solely for a purpose of enhancing data management; wherein a geographic extent of an access area is compared with said geographic extent of said tiles to derive a plurality of involved tiles for said access area;
   (c) performing time-space filtering based on said measured position and said retrieved geospatial data from said geospatial map database to derive a displaying position for a user; wherein said measured position and a previous position and a previous velocity are used to derive a true position for said user; and
   (d) displaying a trajectory of said user on a graphic displaying unit, which tracks a motion of said user.

2. An enhanced inertial measurement unit/global positioning system and map navigation process, as recited in claim 1, further comprising a step of displaying said retrieved geospatial data on said graphic displaying unit as a background.

3. An enhanced inertial measurement unit/global positioning system and map navigation process, as recited in claim 2, further comprising a step of displaying an accurate position of said user on said graphic displaying unit as a mark.

4. An enhanced inertial measurement unit/global positioning system and map navigation system, comprising:
   an integrated IMU/GPS device for providing a position data for a user, wherein said Integrated IMU/GPS device comprises an IMU, a GPS receiver, and means for blending measurements from said IMU and said GPS receiver;
   a remote geospatial database which is stored on a remote computer system, wherein said remote computer system is connected with a computing platform via a data link;
   an operational interface for providing a command input method for a user;
   an integrated menu for providing a collection of functional menus for said user;
   a database query and access module for providing an IMU/GPS-based efficient geospatial database access and spatial query;
   a mission specific database creation module for generating a local database stored in said computing platform from said remote geospatial database;
   a database updating module for adding new features using a inertial measurement unit/global positioning system device as a basic device;
   a feature attribute coding catalogue for encoding for said new features added to said geospatial database and for decoding for said GPS-based efficient geospatial database access and spatial query;
   a communication interface, which provides a communication link between said remote geospatial database and said computing platform;
   a data uploading module for transmitting said new features added to said database to said remote geospatial database via said communication interface; and
   a data downloading module for transmitting said created mission specific database from said remote geospatial database to said computing platform.

5. An enhanced inertial measurement unit/global positioning system and map navigation system, as recited in claim 4, wherein said database access and query module is adapted for performing primitive access and spatial query, wherein said primitive access includes a node access, an edge access and an area access, wherein said spatial query includes a point query, a line query and an area query.

6. An enhanced inertial measurement unit/global positioning system and map navigation process, comprising the steps of:
   (a) receiving a position of a user from an inertial measurement unit/global positioning system device;
   (b) converting a global coordinate to a local coordinate to match a coordinate system employed in a map database;
   (c) retrieving geospatial data from a geospatial map database based on said measured position from said inertial measurement unit/global positioning system device by using a tile index file which stores geographic extent information of tiles; wherein said tiles are geographically subdividing a coverage solely for a purpose of enhancing data management; wherein a geographic extent of an access area is compared with said geographic extent of said tiles to derive a plurality of involved tiles for said access area;
   (d) performing time-space filtering based on said measured position and said retrieved geospatial data from said geospatial map database to derive a displaying position for a user; wherein said measured position and a previous position and a previous velocity are used to derive a true position for said user; and
   (e) performing coordinate conversion from said local coordinate to a pixel coordinate and displaying said position of said user on a graphic displaying unit.

7. An enhanced inertial measurement unit/global positioning system and map navigation process, as recited as claim 6, wherein said inertial measurement unit/global positioning system device comprises a micro IMU, a GPS receiver and means for blending measurements from said micro IMU and said GPS receiver.

8. An enhanced inertial measurement unit/global positioning system and map navigation process, as recited in claim 7, further comprising a step of feeding said true position from said time-space filtering process to said means for blending measurements from said micro IMU and said GPS receiver to further correct navigation error.

9. An enhanced inertial measurement unit/global positioning system and map navigation system, comprising:
   an integrated IMU/GPS device for providing a position data for a user, wherein said Integrated IMU/GPS device comprises an IMU, a GPS receiver, and a means for blending measurements from said IMU and said GPS receiver;
   a geospatial database which is stored on a computing platform and provides a spatial information for a user;

an operational interface for providing a command input method for said user;

an integrated menu for providing a collection of functional menus for said user;

a database query and access module, which provides an IMU/GPS-based efficient geospatial database access and spatial query;

a database updating module for adding new features using a inertial measurement unit/global positioning system device as a basic device;

a feature attribute coding catalogue for encoding for new features added to said geospatial database and for decoding for said efficient database access and query;

a map viewer for displaying a map and a user mark on a screen, for displaying a trajectory of a motion of said user, and for zooming in and zooming out display of said geospatial data, wherein said map is generated from retrieved geospatial data in said database access and query module and displayed as background and said user mark is displayed on said screen to show a position of said user; and a time-space filtering module for fully fusing an IMU/GPS position from said integrated inertial measurement unit/global positioning system device and said retrieved geospatial data in said database query and access module to derive an accurate position of said user.

10. An enhanced inertial measurement unit/global positioning system and map navigation system, as recited in claim 9, wherein said database access and query module is adapted for performing primitive access and spatial query, wherein said primitive access includes a node access, an edge access and an area access, wherein said spatial query includes a point query, a line query and an area query.

* * * * *